United States Patent [19]

Johnson et al.

[11] Patent Number: 5,600,776
[45] Date of Patent: Feb. 4, 1997

[54] METHOD AND APPARATUS FOR AUTOMATICALLY ORGANIZING USER INTERFACE OBJECTS FOR MULTIPLE USERS ON A SINGLE WORKSTATION

[75] Inventors: William J. Johnson, Flower Mound; Larry M. Lachman; Michael D. Smith, both of Irving, all of Tex.

[73] Assignee: International Business Machines Corporation, Armonk, N.Y.

[21] Appl. No.: 271,620

[22] Filed: Jul. 7, 1994

[51] Int. Cl.⁶ .................................................. G06F 3/00
[52] U.S. Cl. .................................................. 395/326
[58] Field of Search ................................ 395/155–161

[56]  References Cited

U.S. PATENT DOCUMENTS 5,335,320  8/1994  Iwata et al. ............................ 395/155
5,420,975  5/1995  Blades et al. ......................... 395/156
5,420,978  5/1995  Tozawa et al. ........................ 395/161

OTHER PUBLICATIONS

Cowart, "Mastering Windows 3.1—Special Edition," Sybex Pub. Inc. 1992, pp. 42 & 74.

*Primary Examiner*—Mark R. Powell
*Assistant Examiner*—A. Katbab
*Attorney, Agent, or Firm*—A. Bruce Clay

[57]  ABSTRACT

Automatic user interface object organization is provided. A user dependent user desktop map is maintained for objects a user manipulates. The user desktop map allows automatic object location, dimension and appearance changes to a newly spawned object according to the state of the object from its last existence on a data processing system user interface for that particular user. Objects not found in a desktop map have user desktop map entries automatically added to the desktop map, and the objects are maintained appropriately to ensure an organized user interface according to user preference.

9 Claims, 15 Drawing Sheets

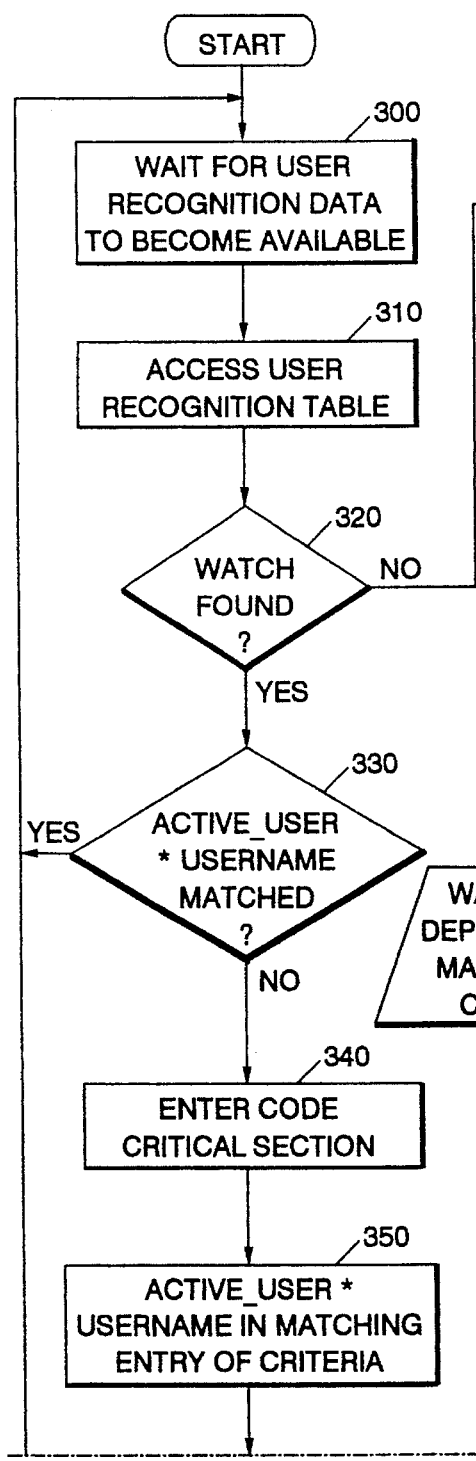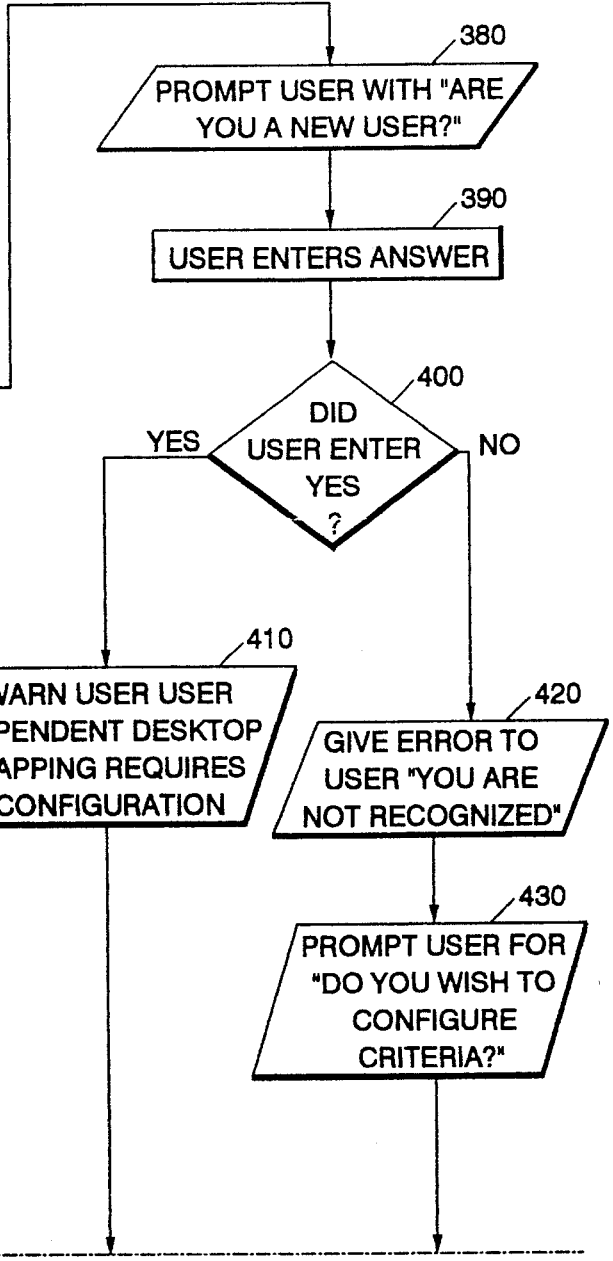
FIG. 8A
FIG. 8

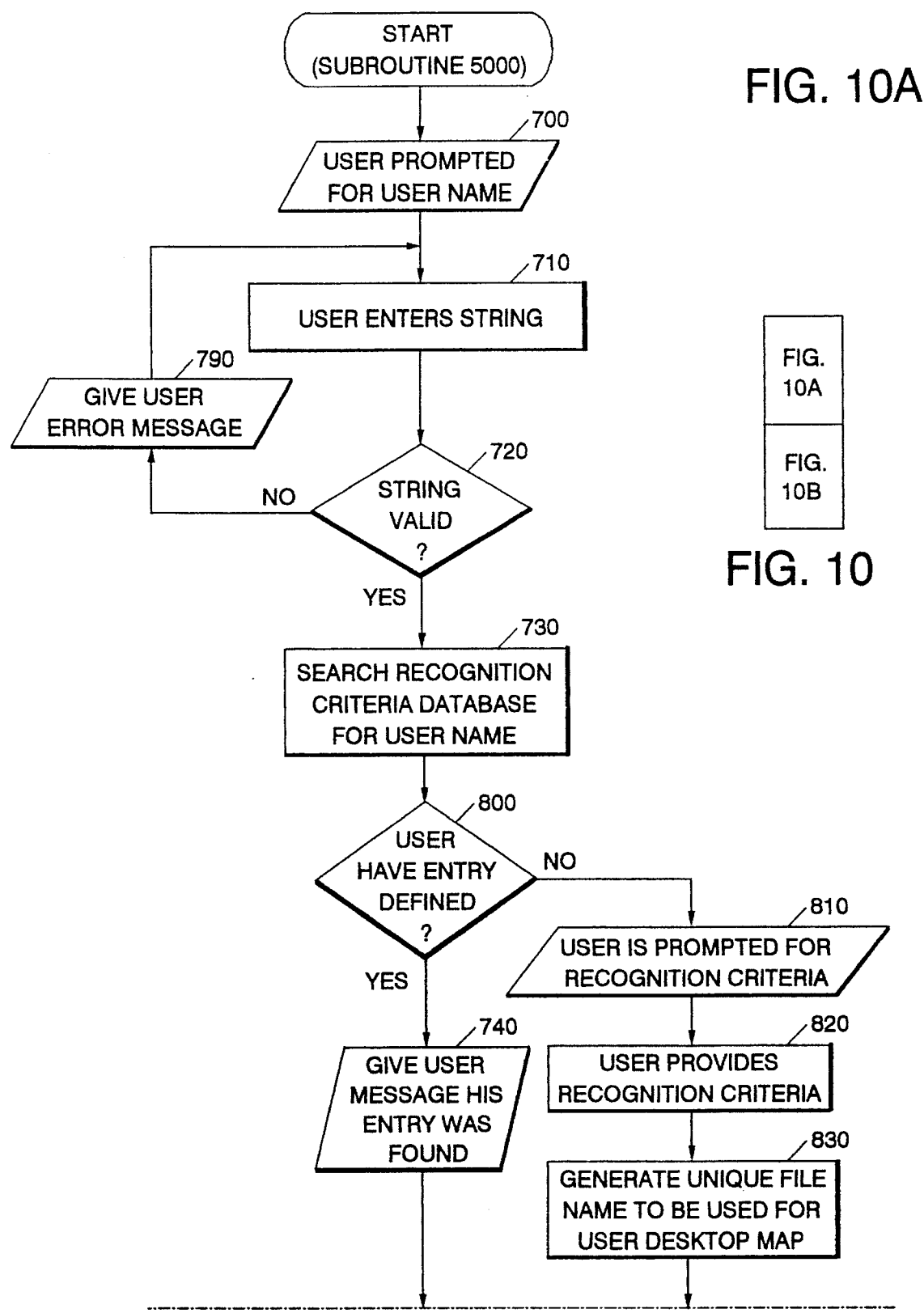

METHOD AND APPARATUS FOR AUTOMATICALLY ORGANIZING USER INTERFACE OBJECTS FOR MULTIPLE USERS ON A SINGLE WORKSTATION

TECHNICAL FIELD OF THE INVENTION

This invention relates in general to data processing systems, and in particular to a method of, and apparatus for, providing automatic user interface object organization.

BACKGROUND OF THE INVENTION

Conventional data processing systems provide capabilities for organizing user interface objects such as icons, windows and the like. Such capabilities require user interaction for manipulating objects so that placement, size and appearance of objects are satisfactory to the user. This interaction may be facilitated with mouse control, and in many scenarios, the mouse is the only device required for manipulating objects. A user may choose to redimension a window, drag an icon to another location on a user interface desktop, place icons within folders, or use a utility to modify color, shading and/or pattern of objects. Different users have different preferences. Window characteristics such as background, foreground, error message text typeface, font and color, title bar appearance and other classifications of object real estate on a user interface may be conveniently tailored to suit a particular user. Appearance changes remain changed through data processing system power off or reboot and only a subsequent change modifies a current setting. Common windowing data processing systems such as "MICROSOFT WINDOWS", "SUN VIEW", "APPLE MACINTOSH", X Window System and "INTERNATIONAL BUSINESS MACHINES OPERATING SYSTEM/2" ("IBM OS/2"), provide graphical user interfaces wherein a user is provided with convenient methods for manipulating locations of user interface objects and modifying the size or appearance of user interface objects. Those skilled in the art are familiar with terms such as "look and feel" of a user interface and the methods for tailoring. ("MICROSOFT" and "WINDOWS" are trademarks of Microsoft Corporation. "SUN" is a trademark of Sun Microsystems, Inc. "APPLE" and "MACINTOSH" are trademarks of Apple Computer Corporation. "IBM", "OPERATING SYSTEM/2" and "OS/2" are trademarks of International Business Machines Corporation.)

As data processing systems become populated with more applications and their associated user interface objects and features, the job of desktop organization becomes more time consuming and is often on-going. Icons and windows of newly spawned applications must often be relocated. Windows must often be resized and placed in a priority view position with respect to other windows. A user may organize the desktop consistently throughout use, no matter how many times the data processing system has been powered off or rebooted. Users recognize that consistent desktop arrangement facilitates efficient object manipulation because the user can depend on where objects are by experience.

Conventional data processing systems have provided methods for dealing with user interface organization beyond object manipulation through a variety of methods. Applications which spawn windows will often tile the windows so that a left and top border of an overlaid window remains visible for easy title bar identification and mouse selection. Those skilled in the art refer to this as cascading windows. This allows many windows to occupy a smaller user interface area while preserving the ability to easily identify and select the window. Often a user manually cascades windows, but applications may be programmable to perform this operation automatically.

Desktop environments, such as "WIDEANGLE" for "MICROSOFT WINDOWS" and "IBM OS/2", allow a user to design and save a custom desktop environment to be automatically loaded at the start of each work session. "IBM OS/2" provides a facility for restoring the desktop to a previous state after the data processing system is shutdown or powered off. Applications which were active at the time of data processing system shutdown are automatically invoked upon the next data processing system startup. Objects are restored to the locations they occupied at the time of shutdown.

Application Ser. No. 07/923,698 filed by W. J. Johnson et al entitled "Method of and Apparatus for Navigating to a Hidden Window" (IBM docket DA9-92-016) disclosed a method for pseudo-random desktop object reorganization upon user request. This disclosure provided a means for reorganizing desktop objects so that most hidden objects become accessible. This disclosure did not address providing means for consistent user dependent desktop object organization throughout time.

Conventional systems only save a desktop as a snapshot at some point in time. Forthcoming objects not contained in a snapshot are subject to default data processing system placement, sizing and characteristics. Saved arrangements are often system dependent, not user dependent. In data processing systems where a user must manually save desktop states, a power-failure could lose a user's desktop state before he had a chance to save it. A user may even forget to save a desktop. On the other hand, a data processing system which automatically returns the desktop to the state it was last in before a power-off or reboot, provides no means for distinguishing between different user's desktops for the next data processing system startup. More importantly, conventional systems do not keep track of all objects that are manipulated by a user throughout time. Only those objects present at the time of saving a desktop state are applicable for a retrieved desktop. Arrangements saved as a desktop snapshot for later recall often will not contain the many objects which may be present in the future. Conventional systems do not have a method for automatically locating a newly spawned desktop object, regardless of at what point in time an object happens to be present on the desktop. Conventional systems will utilize a system default or application programmed method for all newly spawned objects, regardless whether the objects were spawned at least once during the history of a user, and regardless of whether the user manipulated it to a more satisfactory location, size and/or appearance.

Data processing systems are often shared by more than one user. Conventional systems do not automatically recognize users for the purpose of automatically recalling desktop arrangements and affecting forthcoming spawned objects. Furthermore, conventional systems do not automatically recognize users for the purpose of automatically recalling desktop object locations, dimensions and appearance, including that of forthcoming spawned objects.

SUMMARY OF THE INVENTION

The invention disclosed herein comprises a method of, and apparatus for, providing automatic user interface object organization.

In accordance with one aspect of the invention, user interface data processing system interaction for the purpose of desktop organization is eliminated. Desktop object attributes, thus desktop organizations, are automatically saved while a user utilizes the data processing system. Users are automatically recognized, thereby causing the present invention to automatically retrieve the user's desired desktop organization scheme. Furthermore, this invention eliminates the need for a user to manually save and retrieve desktop organizations, while preserving the ability to save the correct user's desktop organization should a system power failure or reboot inadvertently occur.

Another aspect of this invention automatically organizes current data processing user interface objects upon automatic recognition of a particular user. Forthcoming objects, for example those newly spawned, are also automatically organized according to a particular user's desired desktop organization.

Another aspect of this invention preserves consistent desktop organization throughout the life (i.e. history) of a user and data processing system uses. Automatic organization of all objects manipulated, regardless of when an object became first present and manipulated on the desktop, is organized according to a user's preference.

Another aspect of this invention utilizes automatic user identification to save the user from the burden of saving desktop states.

Yet another aspect of the present invention provides a convenient method for automatic object manipulation and organization of existing and newly spawned objects.

Yet another aspect of the present invention allows a convenient method for desktop organization of a data processing system which is shared by more than one user.

The present invention has the advantage of placing newly spawned objects to desirable desktop locations according to where a user last positioned the object, regardless of when the object was last positioned. The last position of an object is automatically learned and maintained by the present invention.

The present invention has the further advantage of modifying appearance attributes such as size, dimensions, color, shading, or the like, of newly spawned objects according to how a user last manipulated the object, regardless of when the object was last manipulated.

In accordance with most aspects of the invention, user interface useability of the data processing system is increased. A user is saved from re-manipulating object attributes such as location, size, appearance, or the like, for the purpose of managing desktop object organization.

In further accordance with most aspects of the invention, user interface efficiency of the data processing system is increased. Existing or forthcoming desktop objects are organized automatically and appropriately for a particular user, regardless of data processing system reboots, power-offs, or uses by other users. A user is provided with the ability to quickly navigate and manipulate objects from consistent experience of where objects are, what their dimensions are and what they look like.

BRIEF DESCRIPTION OF DRAWINGS

For a more complete understanding of the present invention and the advantages thereof, reference is now made to the Detailed Description in conjunction with the attached drawings, in which:

FIG. 7 is a flow chart illustrating the operations preferred in carrying out processing of the present invention upon detecting an attribute change in a desktop object such as an icon, window, or the like, said change including location, dimension, appearance, or the like;

DETAILED DESCRIPTION OF THE INVENTION

Figure 1A:
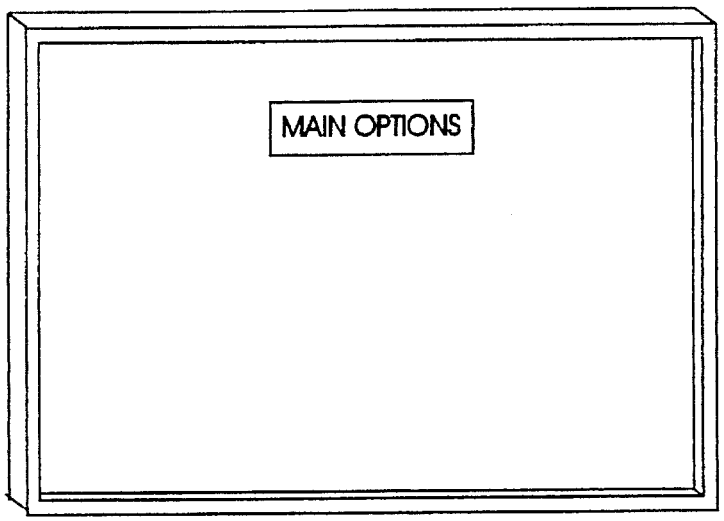
FIG. 1 through FIG. 3 demonstrate operations of a preferred embodiment of the present invention to facilitate understanding of said operations.
Figure 1B:
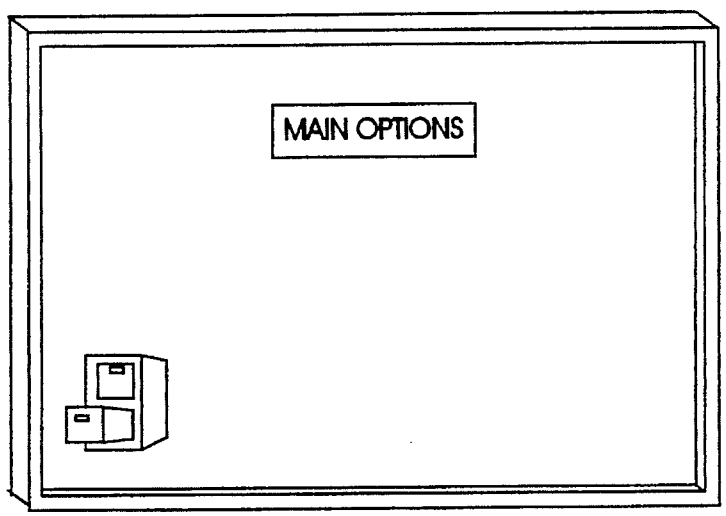
Figure 1C:
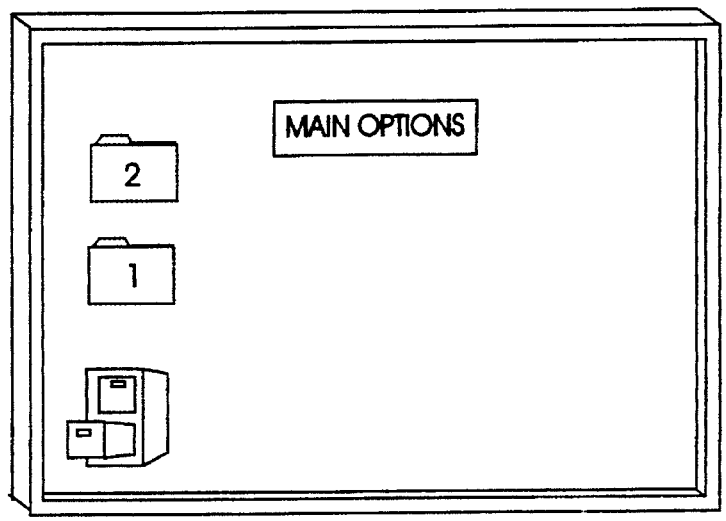
Figure 1D:
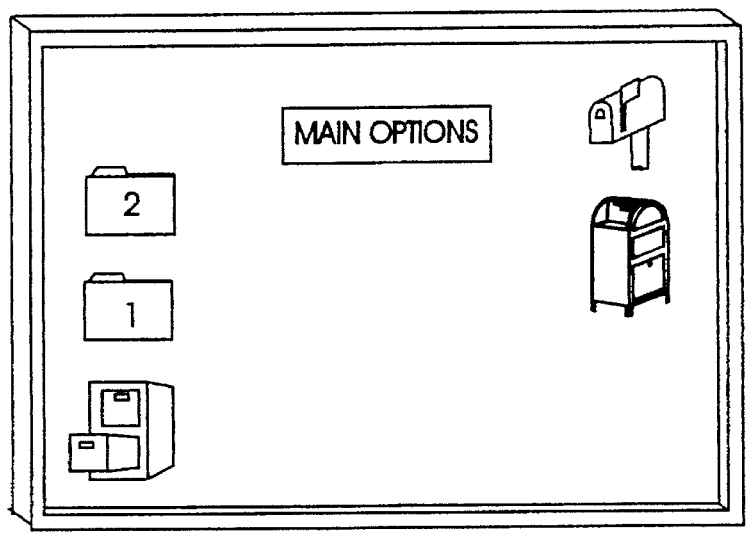
Figure 1E:
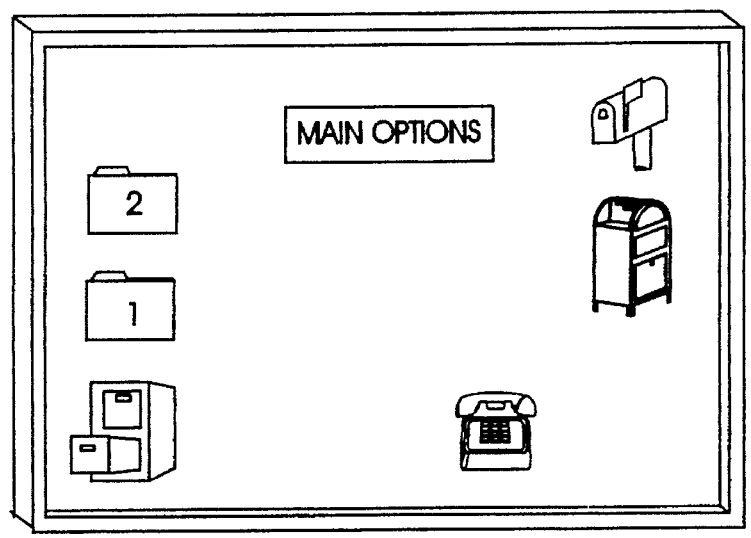
Figure 1F:
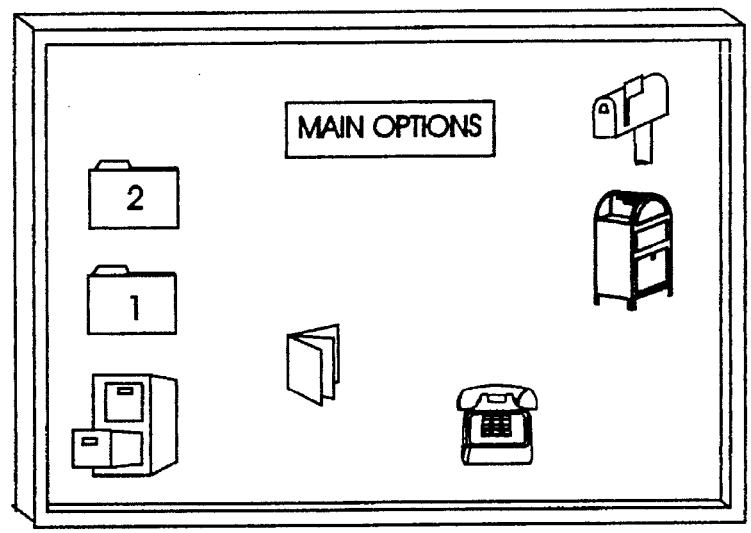
Figure 2A:
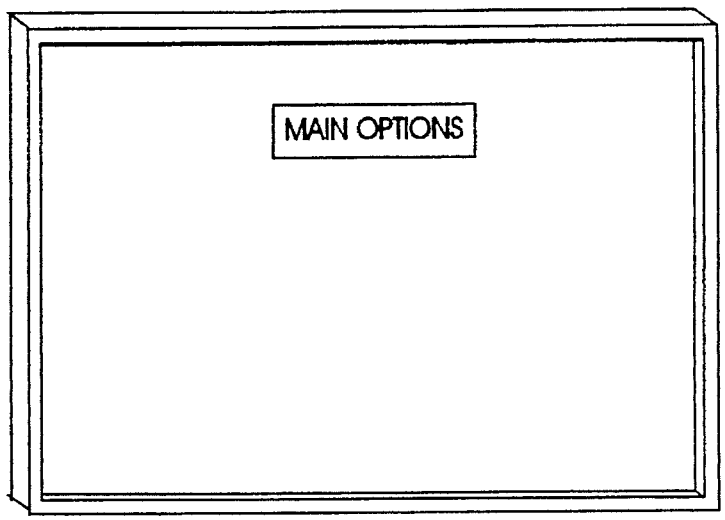
Figure 2B:
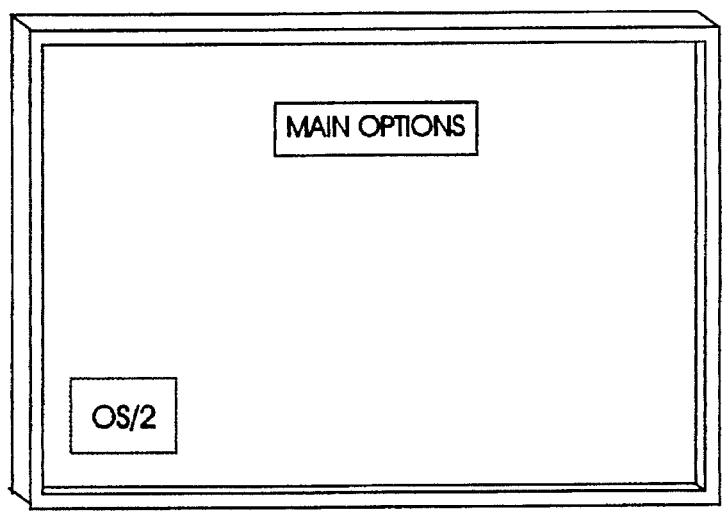
Figure 2C:
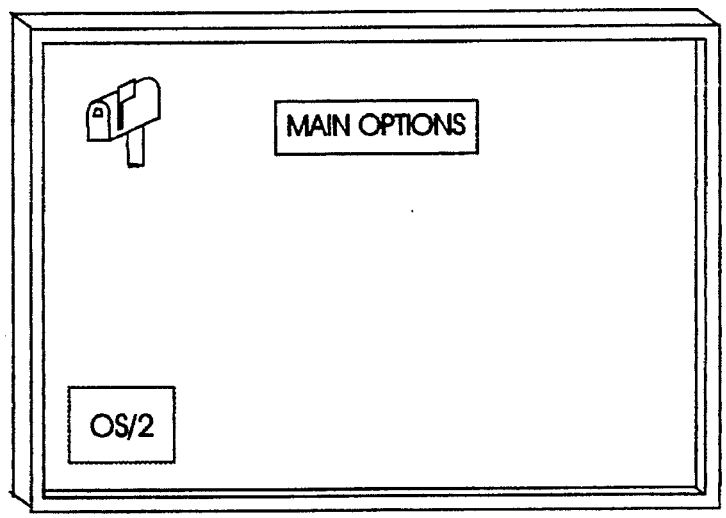
Figure 2D:
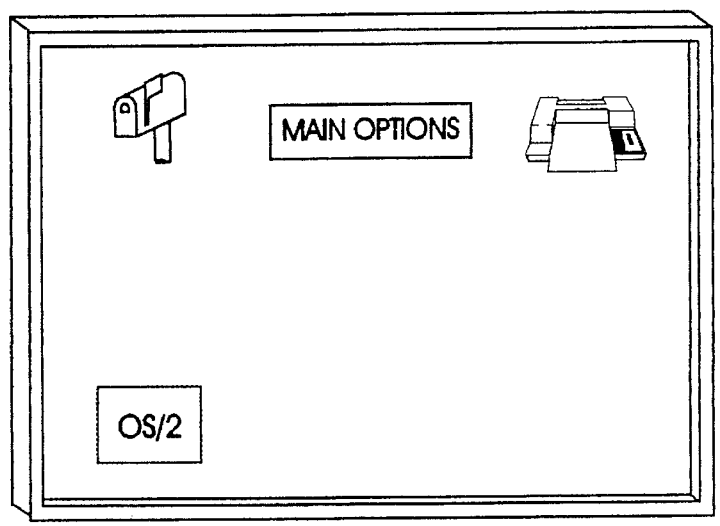
Figure 2E:
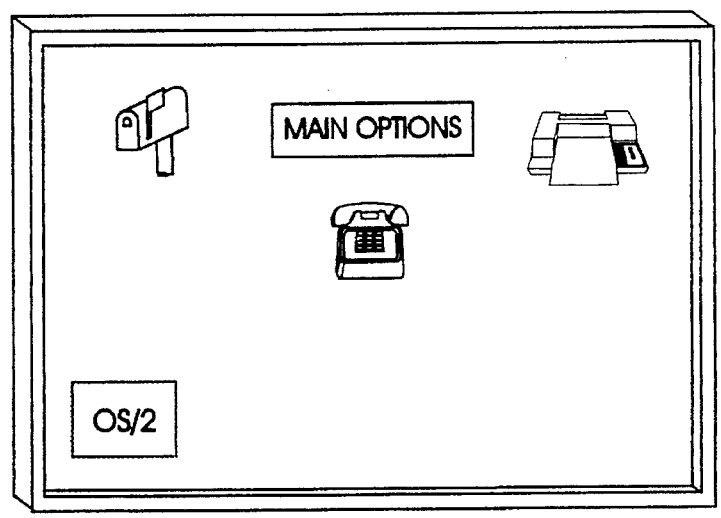
Figure 2F:
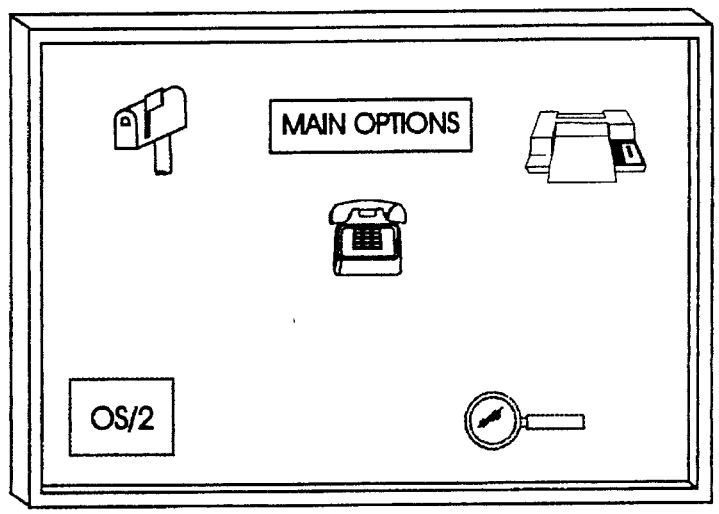
Figure 3A:
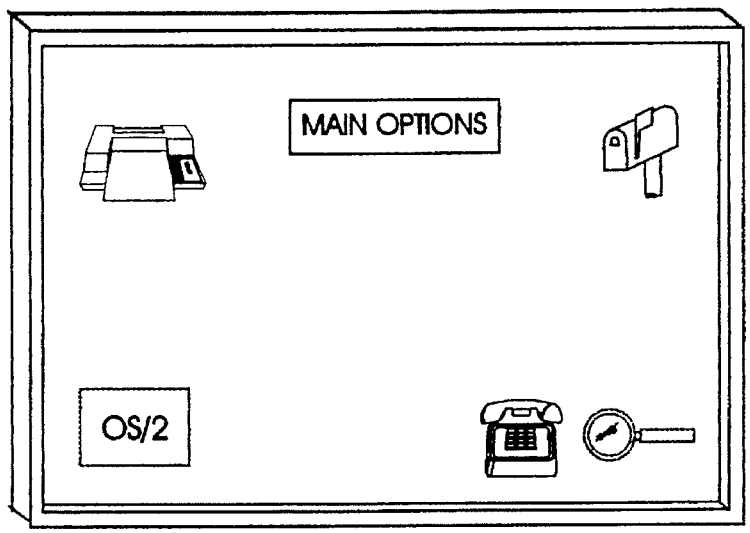
Figure 3B:
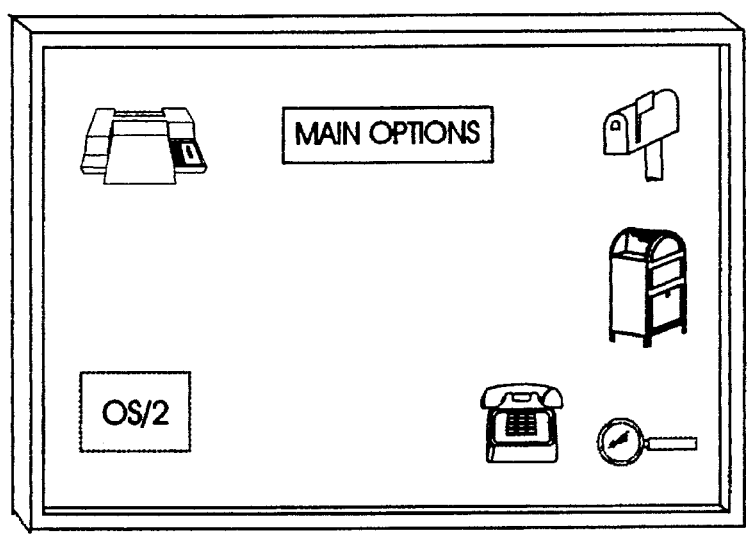
Figure 3C:
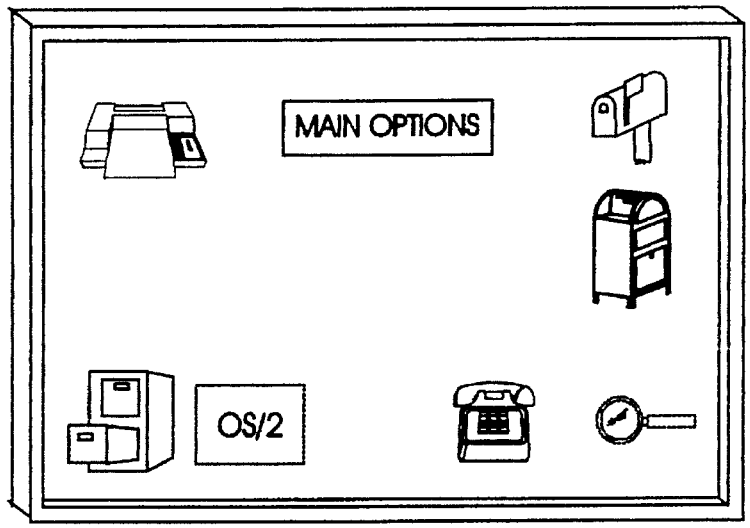
Figure 3D:
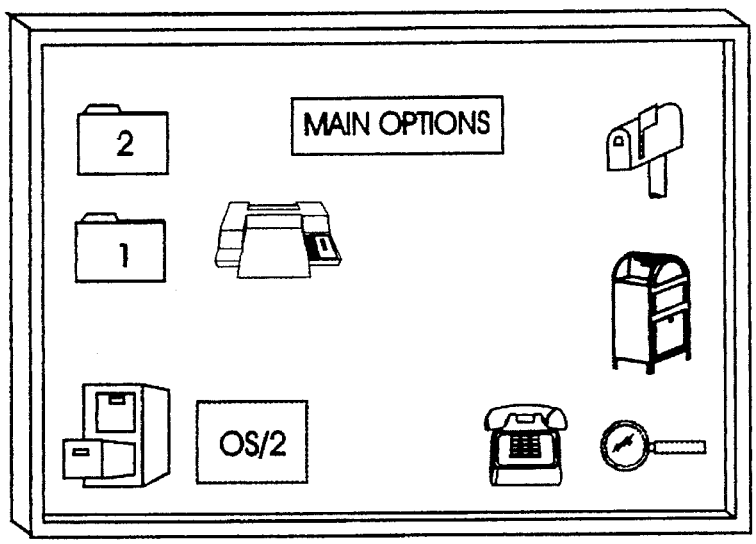
Figure 3E:
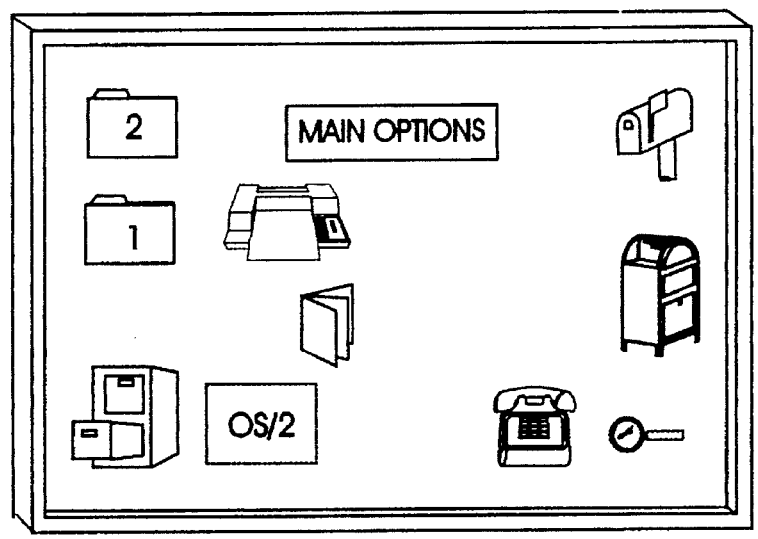
Figure 3F:
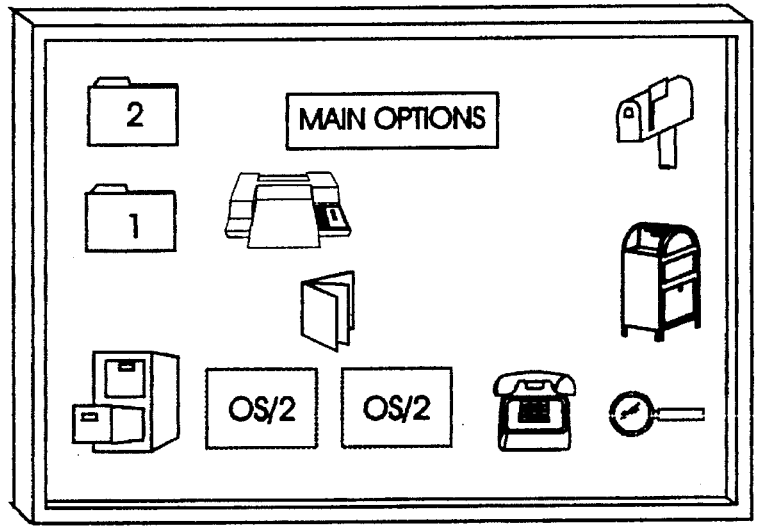

The present invention automatically saves object attribute information for a particular user. The user does not have to manually enter data to validate identity. The data processing system identifies the user through a variety of existing technologies such as voice recognition, fingerprint scan, user image scanning, microdot location proximity, etc. Subsequently, the user's desktop preferences will be recalled so that object placement and appearance corresponds with the user's prior object manipulation preferences.

As objects are manipulated on the desktop, desktop objects (icons, windows, panels, etc.) are registered. In one embodiment, this invention registers and identifies objects uniquely by a combination of their title text, "class" name, desktop coordinates of the lower left corner of the object, the width and height of the object, an active/dormant flag and other implemented attributes applicable to an object. These object variables are entries maintained in what is termed a User Desktop Map. The present invention also keeps information about multiple instances of objects with the same title and class and manages this situation properly. The active/dormant flag indicates either that the object is in current use, or that the object is no longer on the desktop. The User Desktop Map contains a location for each type of object which was manipulated. In the preferred embodiment, a voice control system would associate the unique voice characteristics of a user with the current User Desktop Map. An initialized current Desktop Map is always started when a data processing system has been initialized as the result of a reboot or power-up. In a voice control system embodiment, when the data processing system recognizes the user's voice, all objects manipulated up until the time of recognition are immediately relocated and modified according to the recalled User Desktop Map. If the user's voice is not recognized by the data processing system, the voice data sufficient for matching the voice is associated with the current Desktop Map. At any time during data processing system usage, if a new user voice is detected and no match found, then the new current Desktop Map is assigned the unique voice print.

It is important to understand the concept of the Desktop Map. Each uniquely identified user has a User Desktop Map which contains a list of two-part records. The first part contains unique object identifying information and the second part contains object attribute information. Each User Desktop Map is a dynamic entity. Any time an object is manipulated which does not exist in the User Desktop Map, a record is added to the User Desktop Map. Any time an object is manipulated, which exists in the User Desktop Map, the attribute data is updated. Object manipulation instantaneously updates a User Desktop Map whether it be location, dimension or appearance information. The User Desktop Map never shrinks in objects represented. It is automatically built and contains the superset of all objects manipulated by a user throughout time, wherein the attribute information contained therein corresponds to the last use of a particular object. A User Desktop Map is persistent throughout time and remains intact between data processing system uses including reboots, power-offs, power failures, or the like. As objects are first spawned on the desktop, they take the location, dimension and appearance as described in the User Desktop Map. If no entry exists for the object, it is located by system default and the current Desktop Map initially takes on the object attributes corresponding to the system default. The user only needs to change the location, dimension or attributes of an object to instantly update the associated User Desktop Map entry thereby enabling subsequent system use to locate and affect appearance of the object when spawned at some future time.

Referring first to FIG. 1, there is shown in individual desktop form, six desktop configurations resulting from a USER 1 manipulating desktop objects. Desktop 1A is the initial state of the desktop, and desktop 1F is the final state when the user had completed using the data processing system. All objects are initially placed to locations by a customary system default method such as left to right, bottom to top order. USER 1 then dragged and dropped objects to the desired location, thereby producing desktop 1F which is an organized arrangement preferred by USER 1.

Assuming the data processing system described in FIG. 1 was rebooted or powered off, and a USER 2 used the same data processing system, refer now to FIG. 2 where there is shown in individual desktop form, six desktop configurations resulting from USER 2 using the same data processing system. Desktop 2A is the initial state of the desktop, and desktop 2F is the final state when USER 2 had completed using the data processing system. All objects are initially placed to locations by a customary system default method such as left to right, bottom to top order. USER 2 then dragged and dropped objects to the desired location, thereby producing desktop 2F which is an organized arrangement preferred by USER 2.

With reference now to FIG. 3, assume USER 1 has returned to said data processing system, after USER 2 abandoned the desktop in a state as shown by FIG. 2 desktop 2F. A user recognition process identifies the current user as USER 1 rather than USER 2. Various embodiments exist for automatically identifying a user during data processing system usage. For example, in a voice control interface, the user's voice which is used to navigate objects can be used as the identifying criteria of the user. Upon recognition of USER 1, the current desktop objects are instantly modified to take on preferred characteristics of USER 1 as described by USER 1's User Desktop Map. If objects which are not in the USER 1 User Desktop Map happen to be overlapped by the relocated objects, then the present invention automatically tiles the overlaid objects not present in the User Desktop Map in a configurable fashion. Desktop 3A in FIG. 3 shows what happens when USER 1 is recognized during a desktop state of Desktop 2F in FIG. 2. All objects present at the time of recognizing a new user take on attributes (e.g. location) of objects found in USER 1's User Desktop Map. The Mail Inbox and telephone icons as well as the main Options panel are made to correspond to USER 1's User Desktop Map. The printer icon, magnifying glass icon and "OS/2" icon are not found in USER 1's User Desktop Map and are to be unaffected, however repositioning objects found in the User Desktop Map may cause automatic positioning of other objects to prevent unnecessary overlap or complete overlaying of an object. Thus, the printer icon and magnifying glass icon were repositioned. In Desktop 3B, USER 1 invoked the outgoing mail application icon thereby spawning a new icon. It is placed into a position as dictated by the USER 1 User Desktop Map because USER 1 had placed it there the last time USER 1 located that object. Desktop 3C shows the user spawned a file cabinet application which is also placed to location dictated by the user's learned User Desktop Map. The "OS/2" icon was automatically moved to prevent significant overlap. Desktop 3C in FIG. 3 shows the "OS/2" icon was moved in a fashion consistent with left to right and top to bottom order. Any of a variety of automatic repositioning algorithms could be configured for employment, including maintaining object positions and locating User Desktop Map objects as near as possible to a configured position while preventing complete overlap. Preferably, any repositioning algorithm configured should ensure an object never becomes completely invisible. Desktop 3D shows folders spawned from the file cabinet. They are placed at the prescribed locations, and again the printer icon location is adjusted. Desktop 3E shows the book spawned from a folder is placed appropriately. Desktop 3F shows an icon, which is not contained in the USER 1 User Desktop Map (another "OS/2" icon), is positioned in a system default manner.

While icons and locations were demonstrated in FIG. 1 through FIG. 3, it is well understood by those skilled in the art that arbitrary objects including icons, windows, or the like are manageable by the present invention, and attributes such as dimensions, appearance, or the like may be automatically manipulated in addition to location information. The example was not meant to limit the spirit or scope of the invention.

Figure 4:
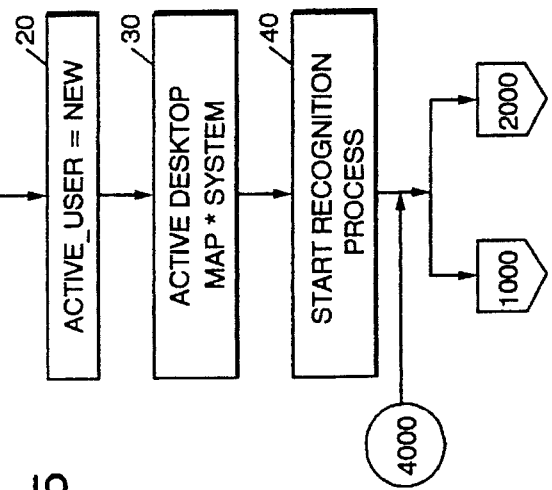
FIG. 4 is a block diagram of a data processing system used in performing the method of the present invention and forming part of the apparatus of the present invention.

With reference now to FIG. 4, there is shown in block diagram form, a data processing system 500 according to the present invention. The data processing system 500 includes a processor 502, which includes at least one central processing unit (CPU) 504, and a memory 506. Additional memory, in the form of a hard disk file storage device 508 and a floppy disk device 510, is connected to the processor 502. Floppy disk device 510 receives a diskette 512 which has data processing system program code or programming implementations recorded thereon that implements the present invention in the data processing system 500. The data processing system 500 may include user interface hardware, including a mouse 514 and a keyboard 516 for allowing user input to the processor 502 and a display 518 for presenting visual data to the user. The data processing system may also include a communications port 520 for communicating with a network or other data processing systems. The data processing system will also include a user recognition device 522 such as fingerprint scanning device, user image scanning device, microdot location proximity scanning device, or any device capable of uniquely identifying a user. Device 522 may also be the microphone itself provided with a voice control system. Although the hardware overview has been particularly shown and described with reference to a preferred embodiment, it will be understood by those skilled in the art that various changes in form and detail may be made without departing from the spirit and scope of the invention.

Referring now to FIG. 5 through FIG. 10, flowcharts illustrating operations preferred in carrying out the present invention are shown. In the flowcharts, graphical conventions known to those skilled in the art are used.. The flowcharts are sufficient to enable one of ordinary skill to write code or a data processing system programming implementation, in any suitable programming language.

Figure 5:
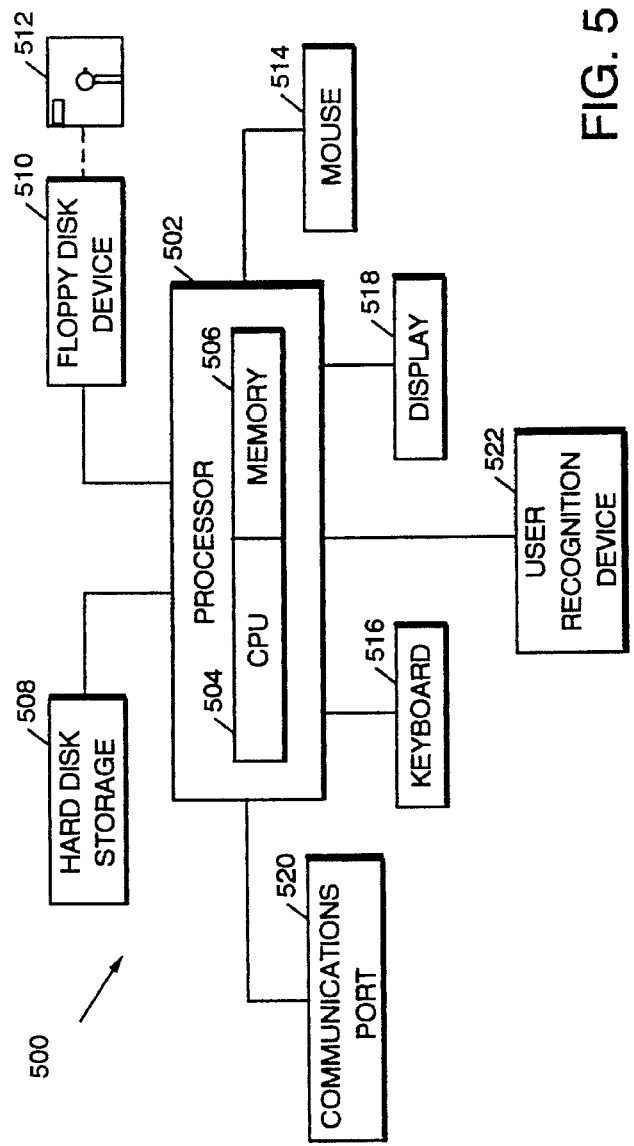
FIG. 5 is a flow chart illustrating the operations preferred in carrying out the data processing system startup of the present invention.

With reference now to FIG. 5, User Desktop Map Manager processing startup and initialization is shown.

Block 10 demonstrates the data processing system has been started either by a cold start (i.e. power-on) or reboot. Thereafter, block 20 initializes an ACTIVEUSER variable to a setting indicating that a new user is currently detected as using the data processing system. Processing continues to block 30 where an ACTIVEDESKTOPMAP variable is initialized to the data processing system default indicating start a new User Desktop Map. The ACTIVEUSER and ACTIVEDESKTOPMAP variables always correspond to whom the system currently registers as being the active user. These variables are initialized to constants which reflect there is no known user using the data processing system yet. Processing continues to block 40 where an asynchronously executing recognition process is started for recognizing the current user. The recognition process can be enabled and disabled with user commands at any time during system operation.

Those skilled in the art recognize there may be many automatically executing processes which are started by the data processing system as part of a typical data processing system start. Only the processing relevant to this invention is demonstrated.

Two Desktop Map Manager hooks are placed into the presentation manager (graphical user interface, etc) of the data processing system. One hook intercepts processing when objects are newly spawned to the desktop, and the other hook intercepts processing when attribute changes are made to an object on the desktop. Because these two hooks may be executed simultaneously by independent threads of execution on a multitasking data processing system, the flow chart in FIG. 5 demonstrates a dual break out. Process block 40 on FIG. 5 flows to process block 50 on FIG. 6. This processing path is illustrated by flow chart connectors 1000 on FIG. 5 and FIG. 6. Process block 40 on FIG. 5 also flows to process block 200 on FIG. 7. This processing path is illustrated by flow chart connectors 2000 on FIG. 5 and FIG. 7.

Block 40 flows to both these blocks simultaneously to indicate the paths may be executed at the same time within the multitasking operating data processing system. Each path represents a hook described which executes based on user or system management of desktop objects.

To facilitate discussion of other figures, it is important to understand a User Desktop Map and the User Recognition Table.

In the preferred embodiment, a User Desktop Map is a table which contains rows for desktop objects that have been previously manipulated by a user. Attributes are maintained in each row and reflect the attributes of the object which were last in effect for the particular user. The User Desktop Map grows throughout time, never becomes smaller in size and contains a number of rows equivalent to the cumulative number of objects a user has manipulated since the user Desktop Map was first created. The preferred embodiment of the User Desktop Map contains the minimum set of columns:

OBJECT CLASS—System Class of the object

OBJECT TITLE BAR TEXT—Title bar text appearing with object

OBJECT STATE FLAG—Whether or not active on the desktop or dormant (only defined in map)

OBJECT ORIGIN COORDINATES—Object window origin cartesian coords (i.e. window bottom left hand corner)

XSIZE—Object window X dimension

YSIZE—Object window Y dimension

Each row contains the five essential data portions. Those skilled in the art will appreciate that all objects are represented within a data processing system as an image within a rectangular window, regardless of the fact that a user may or may not see a rectangular shape of the depicted object. Data used in conjunction with each other is used to identify objects. The corner coordinates and dimensions allow automatically locating and changing objects to a user's User Desktop Map setting. Enhanced embodiments of the User Desktop Map would contain columns for various object appearance options. Of course, any object attributes may be maintained in a User Desktop Map row. Maintaining other attribute information permits automatically changing desktop objects to the user's preferences as indicated in the User Desktop Map. Those skilled in the art recognize there may be many columns in the User Desktop Map for attributes which may undergo automatic tailoring to a user's preferences.

A User Desktop Map contains location, size and other attribute preferences of desktop objects which are manipulated by a user. The user does not have to manually set up a User Desktop Map. The User Desktop Map is automatically created and maintained as a user manipulates objects on the data processing system desktop during normal data processing system use. The User Desktop Map may be implemented as a database table accessed with a Standard Query Language (SQL). It may also be implemented as a file wherein each record in the file is a table row with rows sorted on a key composed of object title bar text and object class to provide a well performing binary search capability on the file.

The User Recognition Table contains rows wherein each row corresponds to a user which has been registered. The preferred embodiment of the User Recognition Table contains the following columns:

USER NAME—User handle a user is known by to the data processing system

RECOGNITION CRITERIA—Criteria responsible for automatically recognizing a user

DESKTOP MAP HANDLE—Fully qualified file name to associated User Desktop Map or qualified database table name The USERNAME field is a handle to correlate a user to a user's Recognition Criteria and Desktop Map Handle. The user name is preferably an alphanumeric string of 1 to 8 characters wherein the first character is alphabetic.

The Recognition Criteria field is dependent on the data processing system which utilizes this invention. For example, a voice recognition data processing system would have multiple voice samples and/or voice print information for a user maintained within this field. The user would be recognized as the user navigated through the data processing system using customary voice commands. A data processing system which utilizes an automatic fingerprint scanning device would maintain one or more graphical images of fingerprints used for subsequent matching. An automatic eye retina scanning device used to recognize a user would also maintain one or more graphics of eye retina data. A graphical imaging device which recognizes a user by appearance or articles of clothing worn could be utilized as well. Those skilled in the art recognize there are various embodiments of automatic user recognition devices which can compare user input data with data maintained in the Recognition Criteria field for the purpose of identifying a user. The Recognition Criteria data must be configured by a user in order for subsequent programmatic recognition of the user. It will be shown that the present invention provides a convenient and timely method for performing configuration.

The Desktop Map Handle is the access path to the User Desktop Map. It may take various forms without departing from the spirit and scope of the invention, of which include a qualified path name of the User Desktop Map embodied in a file or fully qualified database table name. To facilitate discussions hereinafter, a qualified file name may be assumed.

Figure 6:
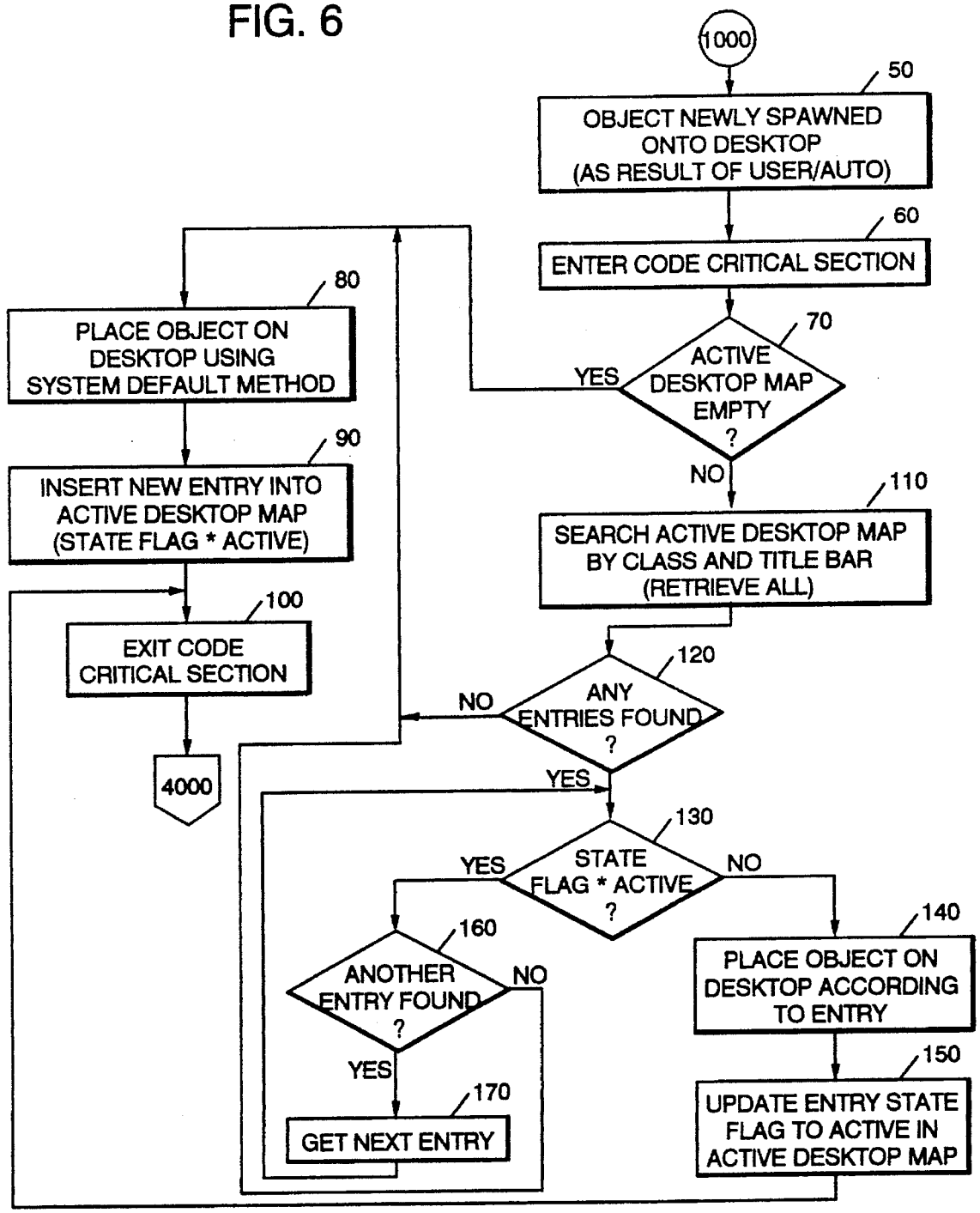
FIG. 6 is a flow chart illustrating the operations preferred in carrying out processing of the present invention upon detecting a newly spawned desktop object.

With reference now to FIG. 6, block 50 demonstrates an object has been newly spawned to the desktop. The FIG. 6 flow chart demonstrates the presentation manager hook for newly spawned desktop objects. The object may be spawned as the result of a user peripheral input (e.g. command, mouse operation, etc) or normal data processing system action. Processing continues to block 60 where a code critical section is entered. This block represents requesting access to a data processing system semaphore which guarantees exclusive access to a shared resource, hereinafter called Active User Variables (i.e. ACTIVEDESKTOPMAP and ACTIVEUSER). All independent and asynchronous processes which access the shared resource, are synchronized so that one process has synchronized access to the shared resource at any particular time. Decision block 70 checks the active Desktop Map to see if it is empty (i.e. no objects) and continues to block 80 if it is. Block 80 places the object on the desktop using a conventional data processing system default method, then inserts a new entry into the ACTIVE DESKTOPMAP file as shown in block 90. The object's class, title bar text and associated attributes as a result of block 80 is placed into the ACTIVEDESKTOPMAP file along with a state flag indicating the object is active on the desktop. Processing continues to block 100 where the code critical section is exited and the Active User Variables may be updated by another process. After block 100, processing then flows back to FIG. 5 where one of various object events may occur to cause further processing. This is indicated by flowchart connectors 4000 on FIG. 6 and FIG. 5. It is not important that the Active User Variables do not yet correspond to the user when the data processing system is first used after being started. Once the data processing system recognizes the user, the user's desktop map automatically becomes in effect and all objects present are instantly relocated and changed according to the user's User Desktop Map. If a user is not recognized, the ACTIVEDESKTOP MAP variable is automatically written out to the user's User Desktop Map once the user is recognized (after being enrolled in the User Recognition Table).

Referring now back to decision block 70, if the ACTIVE DESKTOPMAP contains one or more entries (i.e. objects), then block 110 searches the ACTIVEDESKTOPMAP file for all entries which match in class and title bar text to the newly spawned object. Processing continues to decision block 120 where a determination of entries found is made. If matching entries were not found, then execution continues to block 80 where an object not yet defined in the ACTIVE DESKTOPMAP file is handled as previously described. If in decision block 120, one or more entries were found, then decision block 130 determines the state of the first matching entry in all matching entries found. If, in block 130, the entry is not marked active, then the object is newly spawned and modified to the desktop in block 140 as indicated in the ACTIVEDESKTOPMAP entry. The entry state flag is then updated to active in block 150 to show the object is active on the desktop. Entries are marked active in the ACTIVE DESKTOPMAP on a first encountered first marked basis. This allows multiple instances of the same object to be processed correctly. For example, five instances of an object X in a User Desktop Map would produce five found entries resulting from block 110. If there are only two instances of the objects on the desktop at the particular time, then the algorithm ensures the first two entries in the ACTIVE DESKTOPMAP file are marked as active so that subsequent instances of object X will hit on the third entry in the User Desktop Map which is marked dormant.

Processing continues from block 150 to block 100 where the code critical section is exited as described previously. Referring back to decision block 130, if the current entry state flag is marked active (i.e. object already accounted for and present on the desktop), then processing flows to decision block 160. If in block 160, there were no other entries found from block 110, then processing continues to block 80 where an object not found in the active User Desktop Map (i.e. ACTIVEDESKTOPMAP) is processed as previously described. If, in decision block 160, another entry was found (from block 110), then block 170 gets this next entry and the control passes to decision block 130. Decision block 130 determines the state flag of entries found and flows to the appropriate path as previously described. Blocks 130, 160 and 170 are responsible for looping through all ACTIVE DESKTOPMAP entries found in block 110 which are marked active. The first dormant entry encountered is used to determine appropriate location, dimensions and change of the newly spawned object as indicated in block 140 and subsequent processing. If no dormant entries are found, the newly spawned object is placed as a new object into the active User Desktop Map (i.e. ACTIVEDESKTOPMAP) with block 80 and subsequent processing.

Figure 7:
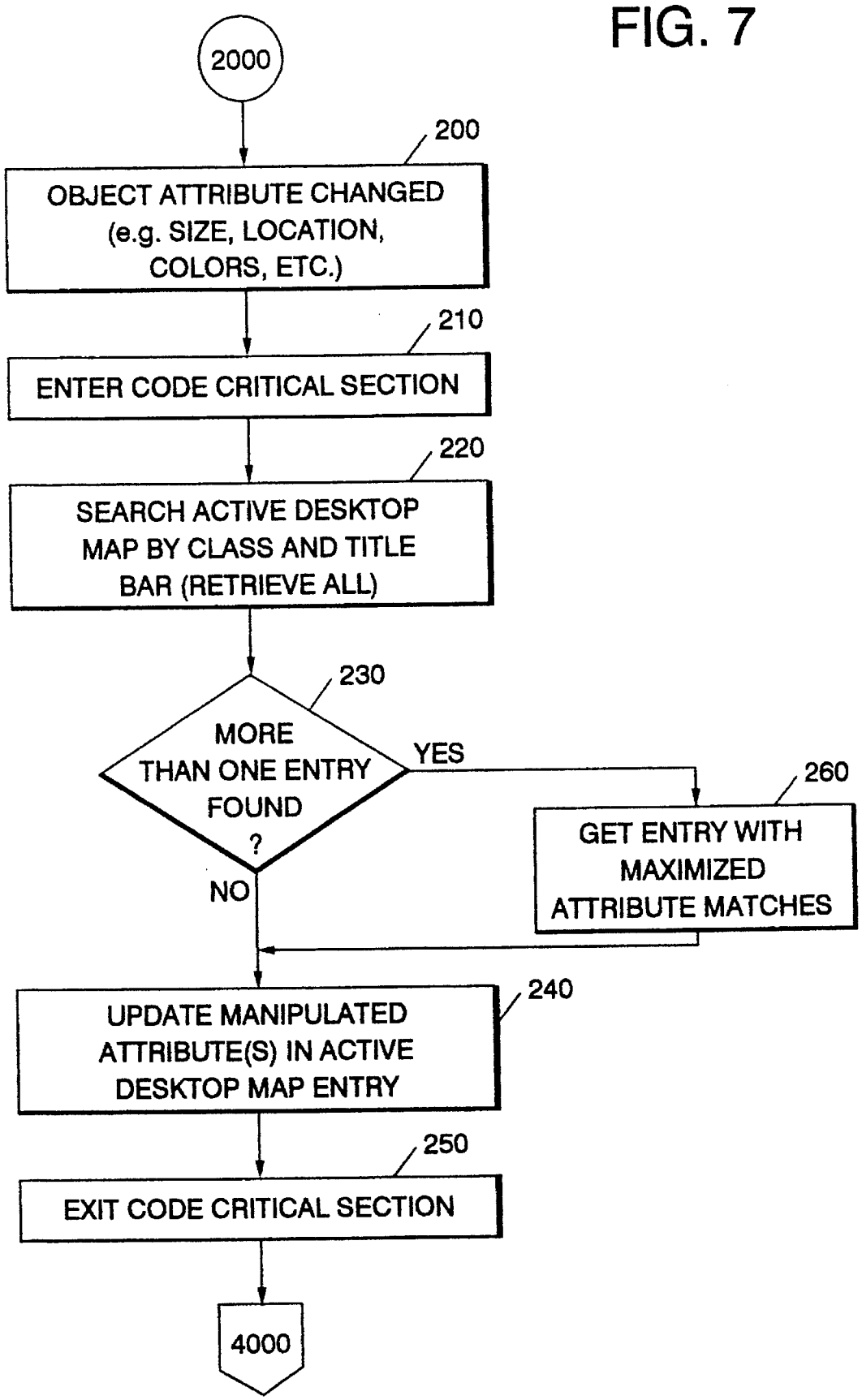

With reference now to FIG. 7, block 200 demonstrates one or more of an object's attributes has been modified. The FIG. 7 flow chart demonstrates the presentation manager hook for desktop objects which had their location, size, appearance or any other implemented attribute modified. The object's attribute change may be a result of a user peripheral input (e.g. command, mouse operation, etc) or automatic data processing system action.

Processing continues to block 210 where a code critical section is entered. This block represents requesting access to a data processing system semaphore which guarantees exclusive access to the shared resource of Active User Variables (i.e. ACTIVEDESKTOPMAP and ACTIVE USER). Block 210 then proceeds to block 220 which searches the ACTIVEDESKTOPMAP for all entries which match in class and title bar text to the modified object. Processing continues to decision block 230 where a determination of number of entries found is made. There will always be at least one entry for an active desktop object. If only one matching entry was found, then execution continues to block 240 where the ACTIVEDESKTOPMAP entry is updated with the most recent state of object attributes. Processing continues to block 250 where the code critical section is exited and the Active User Variables may be updated by another process. Block 250 then flows back to FIG. 5 where one of various object events may occur to cause further processing. This process flow is indicated by flowchart connectors 4000 on FIG. 7 and FIG. 5. Referring back to decision block 230, if more than one entry was found, then execution proceeds to block 260 where the entry with the most number of attribute matches is determined for subsequent processing. The entry with the maximized number of attribute matches, even after attribute changes which caused FIG. 7 to execute, will be the correct entry to update. Processing then continues to block 240 for updating the entry with the most recently updated attribute information. Processing continues from block 240 as previously described.

Figure 8B:
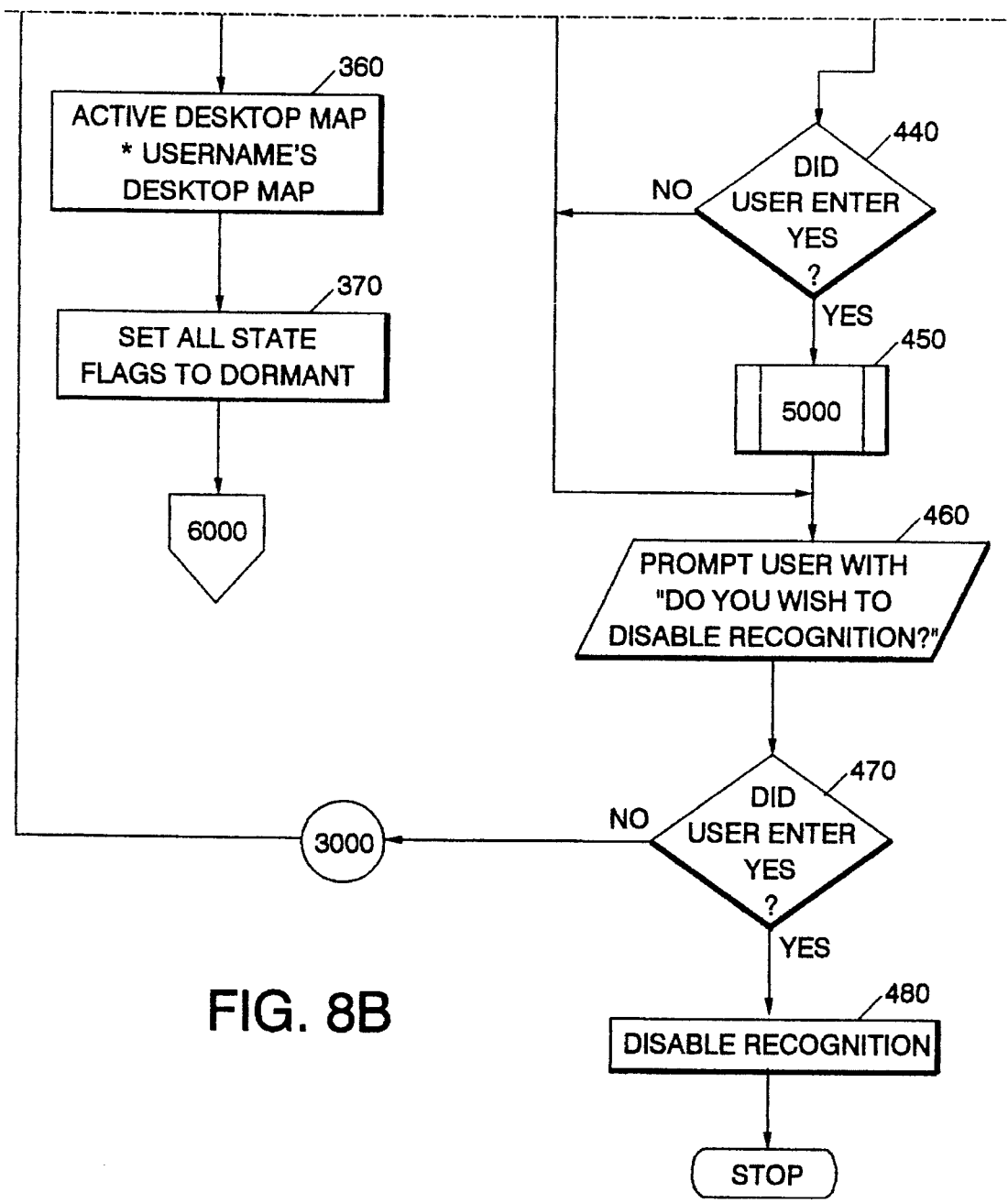
FIG. 8 is a flow chart illustrating the operations preferred in carrying out automatic user recognition processing of the present invention.
Figure 9A:
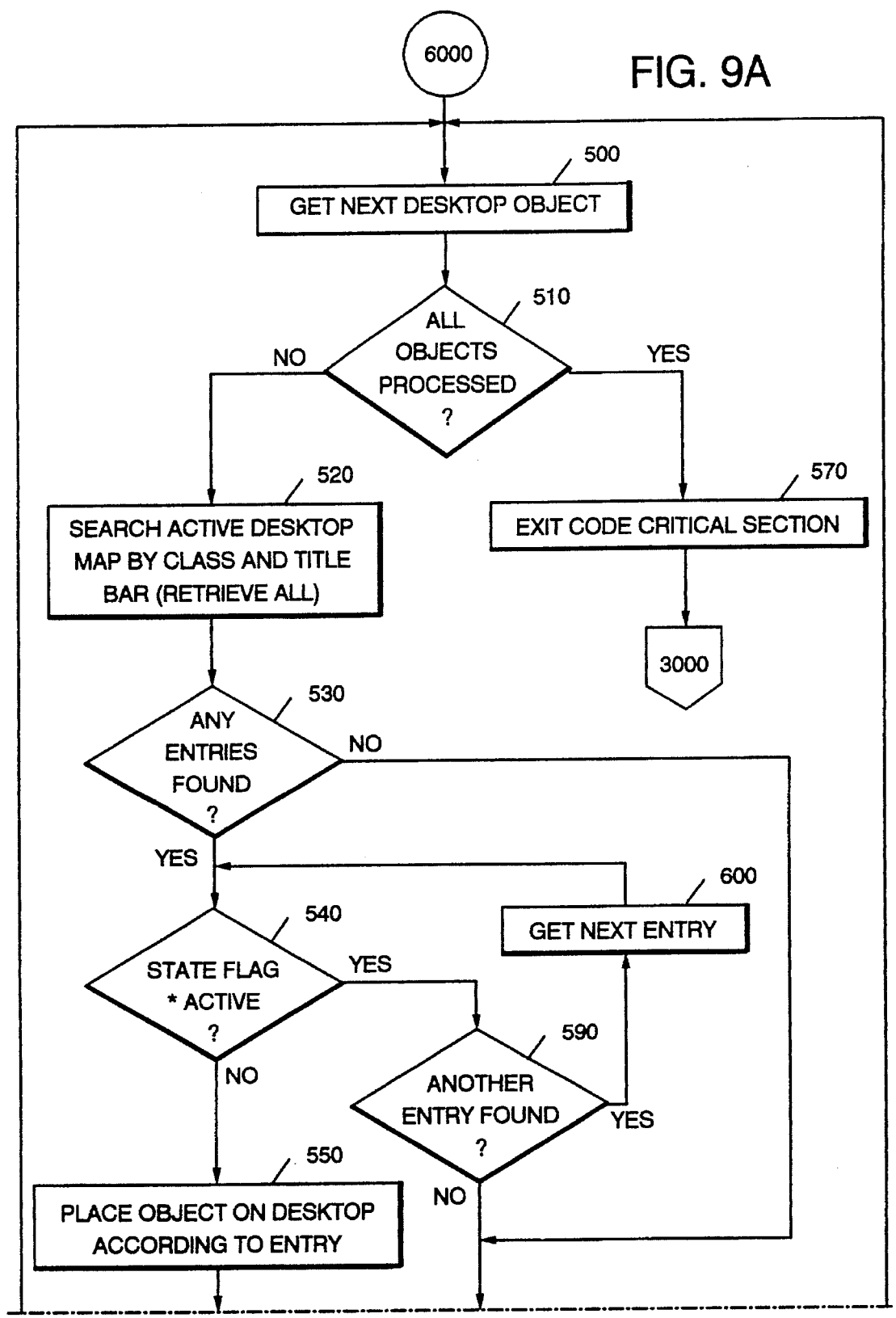
FIG. 9 is a flow chart continuation from FIG. 8 which illustrates further operations preferred in carrying out automatic user recognition processing.
Figures 9, 9B:
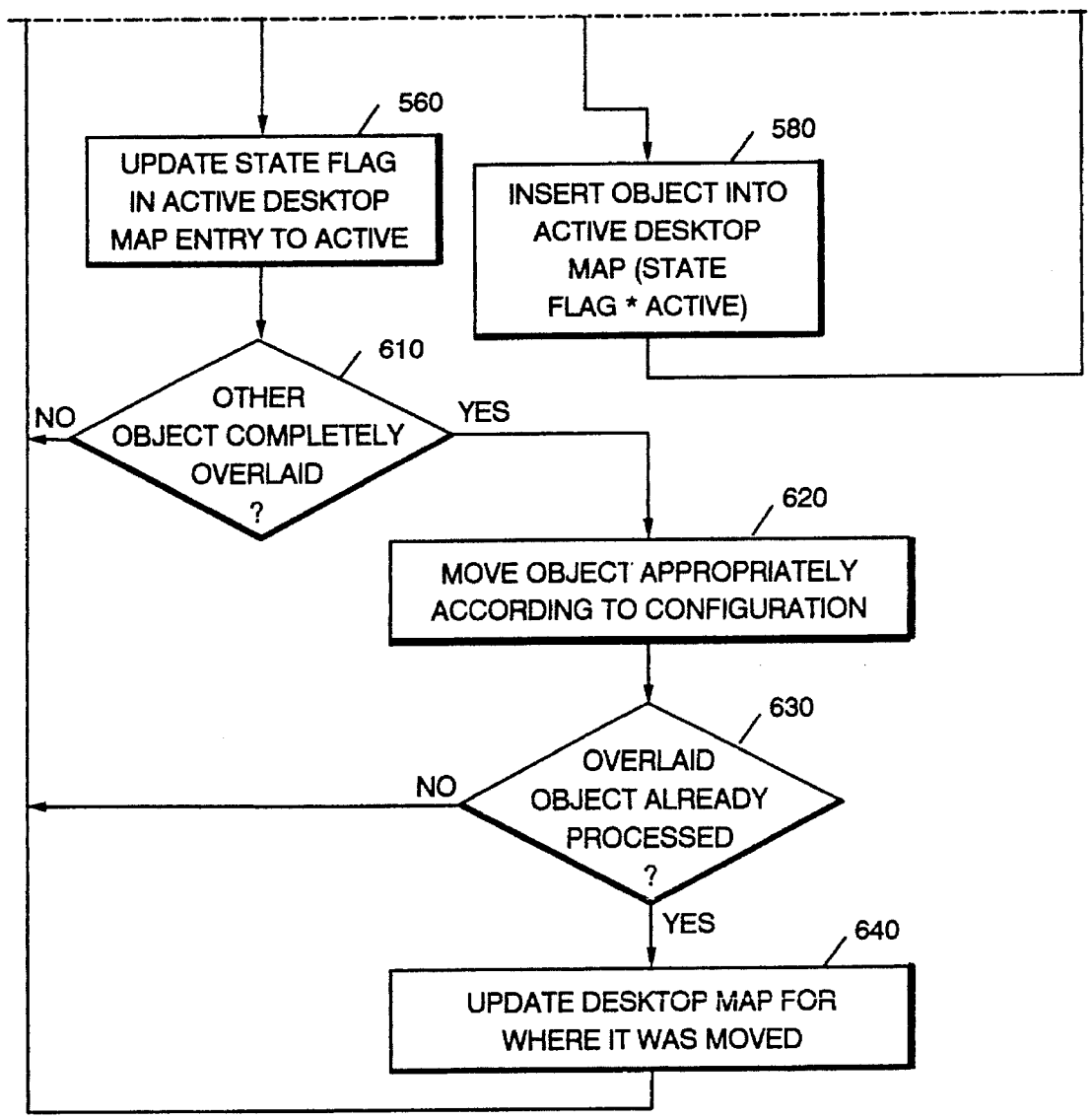

Referring now to FIG. 8, the User Recognition Process is described. The User Recognition Process can be disabled or enabled at any time by a data processing system or user. FIG. 5 block 40 showed the present invention preferred embodiment automatically starts the User Recognition process upon data processing system startup. The User Recognition Process is also an independent asynchronously executing process. When enabled, process block 300 waits for recognition criteria to become available from the appropriate device or source. When user recognition criteria becomes available, processing continues to block 310 where the User Recognition Table is searched using the recognition criteria for a key. Block 310 proceeds to decision block 320. If, in decision block 320, a match is found, then processing continues to decision block 330. If, in decision block 330, the active user (i.e. ACTIVEUSER) is the same as the recognized user, then processing proceeds back to block 300 where a loop continues as long as the ACTIVEUSER remains the current user. As long as the recognized user is the active user, no instant changes in desktop objects or the User Desktop Map is required. The user can disable the recognition process if desired at any time. The preferred embodiment of this invention makes block 300 receive recognition data on predefined intervals which would not cause a performance problem on a data processing system or upon data processing system approach by a new user. Referring back to decision block 330, if the ACTIVE USER is not the same as the recognized user, then processing continues to block 340 where a code critical section is entered and on to block 350 where the ACTIVEUSER variable is set to the USERNAME field from the User Recognition Table entry matched in block 310. Processing continues to block 360 where the ACTIVEDESKTOP MAP is set to the Desktop Map Handle field from the User Recognition Table entry matched in block 310. Processing continues to block 370 where all entry state flags are initialized to dormant in the ACTIVEDESKTOPMAP. Block 370 then continues to block 500 in FIG. 9 by virtue of page connectors 6000 found in FIG. 8 and FIG. 9. Referring now to FIG. 9, block 500 starts a desktop object processing loop which loops through every active desktop object to make sure they instantly reflect the newly activated USERDESKTOPMAP user preferences. Block 500 gets the first desktop object in the list of all active desktop objects when processing continues from block 370 in FIG. 8. Processing continues to decision block 510. If there are no objects on the desktop, decision block 510 proceeds to block 570 where the current code critical section is exited, and on to block 300 on FIG. 8 where the User Recognition Process may continue as already described. This path is indicated by flowchart connectors 3000 on FIG. 9 and FIG. 8. If in decision block 510, there are one or more objects on the desktop, processing continues to block 520 where the ACTIVEDESKTOPMAP is searched for all matching entries by class and title bar text. Processing continues to decision block 530. If in decision block 530, there were no matches found, then the currently active desktop object is appropriately added as an entry to the active user's ACTIVE DESKTOPMAP as shown by block 580, and the state flag is marked active. Processing continues back to the top of the object processing loop, block 500, where the next desktop object can be processed. Referring back to decision block 530, if one or more matching entries were found, then processing proceeds to decision block 540. If in decision block 540, the state flag is not active, then the appropriate matching entry is found and processing continues to block 550 where the object is relocated, resized and changed appropriately according to the ACTIVEUSERDESKTOP entry. Block 550 proceeds to block 560 where the entry's state flag is updated to active, and then on to block 610. Block 610 determines if the placed and modified object caused complete overlay of another object. The preferred embodiment of the present invention ensures no objects are completely overlaid. If, in block 610, an object was not completely obstructed from view, then processing continues back to block 500 where the next object in the main desktop object loop can be processed. If, in block 610, an object was completely overlaid, block 620 moves the object appropriately according to a configured preference for handling this situation. Block 620 then proceeds to block 630. If, in block 630, the overlaid object is one which was already processed by the desktop object loop started at block 500, then the corresponding ACTIVEUSERDESKTOP entry is updated accordingly by block 640 and processing continues back to block 500 where the next object in the desktop object loop can be processed. If, in block 630, the overlaid object is one which has not yet been processed by the desktop object loop, then processing continues back to block 500 where it and other remaining objects can be processed. There are various embodiments for processing block 620 without departing from the spirit and scope of the present invention. Block 620 may adjust the overlaid object or the object being adjusted according to the User Desktop map. Block 620 may reposition either of the conflicting objects with a system default method or any other method for dictating position. Block 620 may resize an object or may allow overlap to occur. Those skilled in the art recognize many options for configuring behavior in block 620 without departing from the spirit and scope of the invention.

Referring now back to block 540, if the state flag is active, thereby indicating the entry is already accounted for by another desktop object of the same class and title bar text, then processing continues to decision block 590. If, in decision block 590, there is another entry found in the ACTIVEDESKTOPMAP file with the same class and title bar text, then processing continues to block 600 where the next entry can be checked for active status. Processing continues from block 600 to decision block 540 where processing continues as previously described. If, in decision block 590, there are no other candidate ACTIVE DESKTOPMAP entries, then processing continues to block 580 where processing continues as previously described. Blocks 540, 590 and 600 define an iterative loop on candidate ACTIVEDESKTOPMAP entries which may correspond to the object being processed by the main desktop object loop started in block 500.

Referring now back to decision block 320 in FIG. 8, if a match was not found in the User Recognition table, then processing continues to block 380 where the user is prompted for whether or not he is a new user. Processing continues to block 390 where the user enters an answer. If the user is a new user, as determined in decision block 400, then block 410 warns the user that user dependent desktop map function requires configuration of the user's recognition criteria. Processing flows to block 460 where the user is prompted for disabling the user recognition process. At this point or any point, the user may invoke the configuration process. The user can disable the User Recognition process at any time. Block 460 is a convenience to a new user who does not want to configure recognition criteria and does not want to be annoyed by ongoing prompts starting in block 380 by subsequent processing. Block 460 continues to decision block 470. If, in decision block 470, the user did not want to disable recognition, then processing continues back to block 300 for subsequent user recognition. If, in decision block 470, the user did want to disable recognition, then block 480 disables it and the User Recognition Process stops. Returning now to decision block 400, if the user claims to not be a new user, then processing continues to block 420 where the user is notified as not being recognized. Processing continues on to block 430 for asking the user if configuring recognition criteria is desired. Processing continues to decision block 440. If, in decision block 440, the user specified to perform configuration, then processing continues to the subroutine block 450. The subroutine 5000 in block 450 is described in detail in FIG. 10. Return from subroutine 5000 causes continuation at block 460 for processing as previously described. If, in decision block 440, the user specified to not configure recognition criteria, then processing continues to block 460 as previously described. Processing blocks 430, 440 and 450 are provided as a convenience to a user wishing to immediately start configuring recognition criteria upon being prompted it is required. The subroutine 5000 may also be called by a main program which may be started at any time under user, administrator or security officer control.

Figure 10B:
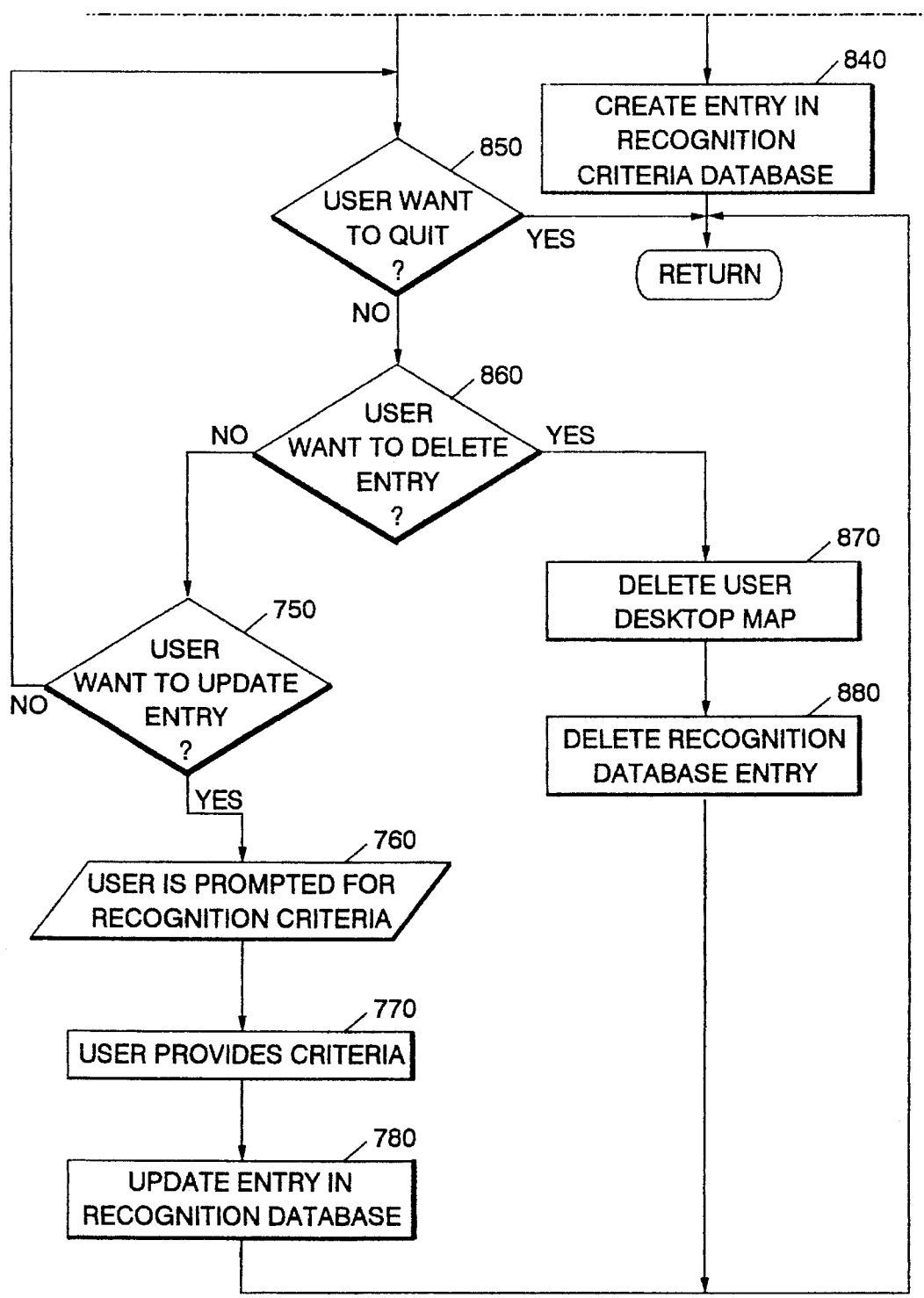
FIG. 10 is a flow chart illustrating the operations preferred in carrying out the user recognition configuration processing of the present invention.

Referring now to FIG. 10, the User Recognition Configuration Process is described. The preferred embodiment of this process is a subroutine so that one instance of the implementation can be invoked from multiple execution paths. This subroutine is invoked from a main program which is started and terminated under user control. It is also optionally invoked from the User Recognition Process discussed on FIG. 8. Referring now to block 700, the user is prompted for entering a user name identifier. This will be a human discernable handle to configured criteria. Processing continues to block 710 where the user enters a user name string, and then on to decision block 720 where string validation is performed. If the string is not valid, processing continues to block 790 where the user is given an error message and block 710 is returned to for another entry attempt. If, in decision block 720, the string is valid, processing flows to block 730 where the User Recognition Table is searched using the user entered string for a key. The user name is preferably an alphanumeric string of 1 to 8 characters and the first character must be alphabetic. Execution moves on to decision block 800. If, in decision block 800, the user does not have an entry defined, then processing moves to block 810 where the user is prompted for appropriate recognition data. The user then provides the recognition criteria in block 820. As discussed previously, the user recognition data depends on the data processing system environment and user recognition device(s) utilized. Training or other methods may be required in block 820. After providing appropriate recognition data, processing block 830 generates a unique handle (e.g. file name) on the data processing system which will be used for the user's User Desktop Map. The User Desktop Map is preferably hidden and only known to the most adventurous of administrators. Processing then flows on to block 840 where an entry is placed into the User Recognition Table. Processing then flows back to the calling program. Referring now back to decision block 800, if the user does have an existing entry defined, then flow continues to block 740 where the user is notified his entry was found. Processing continues to decision block 850. If, in decision block 850, the user wishes to quit, then control passes back to the calling program. If, in decision block 850, the user does not want to quit, then processing flows to decision block 860 where the user may select to delete the entry. If the user wants to delete the entry, processing continues to block 870 where the user's User Desktop Map file is deleted and then on to block 880 where the entry is deleted from the User Recognition Table. Control then passes back to the calling program. Returning now to decision block 860, if the user does not want to delete the entry, then decision block 750 determines if the user wants to update the entry. If, in decision block 750, the user wishes to update the entry, then processing continues to block 760 where the user is prompted for user recognition criteria. Processing then continues to block 770 where the user provides the criteria and then on to block 780 where the User Recognition table is updated with the new criteria. Depending on the environment, the updated criteria may replace or be added to (e.g. retraining) existing criteria. Control then proceeds back to the calling program. Returning now to decision block 750, if the user does not want to update his entry, then control passes back to block 850 for processing as previously described. In all cases where control passes back to the calling program, the User Recognition Configuration Process has been terminated.

Upon reference to the foregoing, those skilled in the art will appreciate that the Applicants have created an intuitive and novel technique whereby a data processing system user interface is automatically organized according to a particular user's preferences.

In an alternative embodiment which is sensitive to security issues, it may be important for a user new to a desktop (which contains objects) to identify himself to the recognition processor before manipulating objects. One embodiment of the present invention allows a user to specify his session is complete. In a voice control interface embodiment, a keyword or phrase may be spoken to end the session and the recognition process would acknowledge. The user would then be satisfied that the session is complete and the user would be relieved of worrying that subsequent users could affect his User Desktop Map. The next user's User Desktop Map would begin (i.e. the current Desktop Map) after the recognition process identifies the user. If no identification is made, then the current Desktop Map is saved with a new entry for the newly identified user.

Yet other alternative embodiments may detect a particular user by collecting multiple types of recognition data to ensure an accurate recognition. The recognition data may be used in conjunction with each other to more accurately identify a user. Even unusual recognition criteria such as user typing speed and style of navigation can be used in conjunction with other data to help determine a user accurately. A highly secure data processing system may recognize a user's fingerprint on scanned keys on a keyboard without the user knowing a recognition is being performed. An eye retina scan may also be implemented. Those skilled in the art recognize a variety of methods for artificial intelligent recognition of a data processing system user without departing from the spirit and scope of the present invention.

In one alternative embodiment, the User Recognition Configuration process, as shown in FIG. 10, could be modified so it is performed by an administrator or security guard. The recognition information, whether it be fingerprint, eye retina, voice, or appearance data, or the like, could be provided by the administrator or security guard to the User Recognition Table without users being aware the data was configured. In this embodiment, the User Recognition process flows, shown in FIG. 8, would be modified in decision block 320. If the user is not known, decision block 320 would continue by flowing to processing which would indicate to the user he is an unknown user. Various embodiments at this point could either prevent the user from continuing with using the data processing system or warn the user he should be appropriately registered in the appropriate manner.

In yet another embodiment, groups of users could be configured in the User Recognition Table. For example, during the User Recognition Configuration process, an administrator or security guard could configure the present invention with appearance data such as blue uniform for one type of user, white uniform for another type of user, and black uniform for another type of user. Then, a device capable of recognizing users based on the uniform they are wearing would activate the appropriate User Desktop Map for a particular group of users. Various embodiments for how to group sets of users would depend on the method for performing recognition. The recognition aspect of this invention is a substituted element and may take on various forms without departing from the spirit and scope of the invention.

In yet another alternative embodiment, for a complicated data processing system with storage constraints that make it difficult to persistently store many User Desktop Maps or large User Desktop Maps throughout time, a maximum number of User Desktop Maps may be enforced or a maximum number of objects may be enforced in a User Desktop Map. The User Desktop Map size may also be configurable. Additionally, the most recently used objects may be maintained. Options for maintaining (e.g. update, delete, etc) a User Desktop Map and starting from scratch for a user can also be implemented on the data processing system.

While in the preferred embodiment, the User Desktop Map and User Recognition Table are managed separately, an alternative embodiment may manage both as one data entity such as a table wherein the Desktop Map Handle column in the User Recognition Table is replaced with the actual User Desktop Map data. It may be advantageous from a program development and performance standpoint to manage these two tables separately.

Alternative embodiment implementations of supported dynamically updated attributes include location, dimensions, colors, patterns, typefaces, fonts, associated sound attributes, associated user interface attributes, associated executable attributes, or any manipulatable characteristic of an object.

Although the present invention has been particularly shown and described with reference to a preferred embodiment, it will be understood by those skilled in the art that various changes in form and detail may be made without departing from the spirit and scope of the invention.

What is claimed is:

1. A method for automatic user interface object organization within a data processing system comprising at least one personal computer accessible by a plurality of users, said method comprising the steps of:

defining and storing a user desktop map for each of said plurality of users, said desktop map registering and identifying User interface objects by a preset combination of attributes thereof;

automatically recognizing one of said plurality of users;

automatically presenting said one of said plurality of users with any of said user interface objects already present, rearranged in accordance with said desktop map as previously stored;

determining a presence of a newly spawned object; and automatically positioning said newly spawned object in accordance with said user desktop map, wherein each of said plurality of users is presented with a desktop organized and arranged according to their individual preference.

2. The method according to claim 1, further including the step of presenting an object to a user in a default manner upon determination that a corresponding entry does not exist in said user desktop map.

3. The method according to claim 1, further including the step of configuring user recognition criteria.

4. A computer program product recorded on computer readable medium for automatic user interface object organization within a data processing system, said data processing system comprising at least one personal computer accessible by a plurality of users, said product comprising:

programming means for defining and storing a user desktop map for each of said plurality of users, said desktop map registering and identifying user interface objects by a preset combination of attributes thereof;

programing means for automatically recognizing one of said plurality of users;

programing means for automatically presenting said one of said plurality of users with any of said user interface objects already present, rearranged in accordance with said desktop map as previously stored;

programing means for determining a presence of a newly spawned object; and programming means for automatically positioning said newly spawned object in accordance with said user desktop map, wherein each of said plurality of users is presented with a desktop organized and arranged according to their individual preference.

5. The commuter program product of claim 4 further including programming means for presentation of an object to a user in a default manner upon determination that a corresponding entry does not exist in said user desktop map.

6. The commuter program product of claim 4 further including programming means for configuring user recognition criteria.

7. A system for automatic user interface object organization on a data processor comprising at least one personal computer accessible by a plurality of users, said system comprising:

means for defining and storing a user desktop map for each of said plurality of users, said desktop map registering and identifying user interface objects by a preset combination of attributes thereof;

means for automatically recognizing one of said plurality of users;

means for automatically presenting said one of said plurality of users with any of said user interface objects already present, rearranged in accordance with said desktop map as previously stored;

means for determining a presence of a newly spawned object; and means for automatically positioning said newly spawned object in accordance with said user desktop map, wherein each of said plurality of users is presented with a desktop organized and arranged according to their individual preference.

8. The system of claim 7 further including means for presentation of an object to a user in a default manner upon determination that a corresponding entry does not exist in said user desktop map.

9. The system of claim 7 further including means for configuring user recognition criteria.

* * * * *